(12) United States Patent
Hara

(10) Patent No.: US 10,998,998 B2
(45) Date of Patent: May 4, 2021

(54) TEST CONTROLLER, OPTICAL WAVELENGTH MULTIPLEXING TRANSMISSION APPARATUS, TEST CONTROL CIRCUIT AND METHOD, AND PROGRAM RECORDING MEDIUM

(71) Applicant: NEC Corporation, Tokyo (JP)

(72) Inventor: Yasushi Hara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/497,005

(22) PCT Filed: Mar. 22, 2018

(86) PCT No.: PCT/JP2018/011484
§ 371 (c)(1),
(2) Date: Sep. 24, 2019

(87) PCT Pub. No.: WO2018/180913
PCT Pub. Date: Oct. 4, 2018

(65) Prior Publication Data
US 2020/0099462 A1    Mar. 26, 2020

(30) Foreign Application Priority Data
Mar. 30, 2017  (JP) ............................. JP2017-069165

(51) Int. Cl.
*H04J 14/02* (2006.01)
*H04B 10/077* (2013.01)
(Continued)

(52) U.S. Cl.
CPC ............ *H04J 14/02* (2013.01); *H04B 10/077* (2013.01); *H04B 10/07957* (2013.01); *H04B 10/572* (2013.01)

(58) Field of Classification Search
None
See application file for complete search history.

(56) References Cited

U.S. PATENT DOCUMENTS

| 2001/0019436 A1 | 9/2001 | Nakajima et al. |
| 2004/0062550 A1 | 4/2004 | Terahara et al. |
| (Continued) | | |

FOREIGN PATENT DOCUMENTS

| CN | 1469579 A | 1/2004 |
| CN | 103973390 A | 8/2014 |
| (Continued) | | |

OTHER PUBLICATIONS

International Search Report for PCT Application No. PCT/JP2018/011484, dated Jun. 26, 2018.

(Continued)

*Primary Examiner* — Darren E Wolf

(57) ABSTRACT

A test controller of a transmitting-side optical wavelength multiplexing transmission apparatus of the present invention includes a wavelength tunable filter controller configured to control a center wavelength and a wavelength band of an optical signal that a wavelength tunable filter transmits; and a test transponder controller configured to control a wavelength band of a test optical signal generated by a test transponder and a wavelength interval between the test optical signal and the optical signal that the wavelength tunable filter transmits. A test controller of a receiving-side optical wavelength multiplexing transmission apparatus of the present invention includes a wavelength tunable filter controller configured to control a center wavelength and a (Continued)

wavelength band of an optical signal that a wavelength tunable filter transmits; and a test transponder controller configured to control a center wavelength and a wavelength band of a test optical signal received by a test transponder.

5 Claims, 8 Drawing Sheets

(51) Int. Cl.
 *H04B 10/079* (2013.01)
 *H04B 10/572* (2013.01)

(56) References Cited

U.S. PATENT DOCUMENTS

| | | | |
|---|---|---|---|
| 2006/0013585 A1* | 1/2006 | Hnatiw | G01J 3/28 398/38 |
| 2006/0198636 A1* | 9/2006 | Charlet | H04J 14/0204 398/83 |
| 2010/0239260 A1 | 9/2010 | Oikawa et al. | |
| 2014/0205281 A1 | 7/2014 | Sone et al. | |
| 2015/0280852 A1 | 10/2015 | Nakagawa et al. | |
| 2015/0381276 A1 | 12/2015 | Saito et al. | |
| 2016/0204876 A1 | 7/2016 | Kamura et al. | |
| 2016/0381441 A1 | 12/2016 | Nagamine et al. | |

FOREIGN PATENT DOCUMENTS

| | | |
|---|---|---|
| EP | 2720396 A2 | 4/2014 |
| JP | H11-027238 | 1/1999 |
| JP | 2001-066219 | 3/2001 |
| JP | 2001-251245 | 9/2001 |
| JP | 2010-226169 | 10/2010 |
| JP | 2012-023607 | 2/2012 |
| JP | 2016-010040 | 1/2016 |
| JP | 2016-131274 | 7/2016 |

OTHER PUBLICATIONS

English translation of Written opinion for PCT Application No. PCT/JP2018/011484.
Extended European Search Report for EP Application No. EP18777833.7 dated Mar. 19, 2020.
Chinese Office Action for CN Application No. 201880022861.6 dated Jul. 3, 2020 with English Translation.

* cited by examiner

TEST CONTROLLER, OPTICAL WAVELENGTH MULTIPLEXING TRANSMISSION APPARATUS, TEST CONTROL CIRCUIT AND METHOD, AND PROGRAM RECORDING MEDIUM

This application is a National Stage Entry of PCT/JP2018/011484 filed on Mar. 22, 2018, which claims priority from Japanese Patent Application 2017-069165 filed on Mar. 30, 2017, the contents of all of which are incorporated herein by reference, in their entirety.

TECHNICAL FIELD

The present invention relates to a test controller, an optical wavelength multiplexing transmission apparatus, a test control circuit and method, and a program recording medium.

BACKGROUND ART

In related optical wavelength multiplexing transmission systems, an arrayed-waveguide grating (AWG) is used for wavelength multiplexing and demultiplexing, and an introduced optical signal is accommodated within a certain wavelength grid regardless of its optical signal type (FIG. 6). However, the data capacity has been increased in recent years due to drastic advancements in signal processing technology, and a small capacity optical signal and a large capacity optical signal have come to be accommodated in the same optical wavelength multiplexing transmission system. In such a system, a device such as a wavelength selective switch (WSS) is introduced, which enables a signal with any band to be accommodated within any wavelength interval.

Accordingly, it has been required to optimize the wavelength interval in order to accommodate wavelength multiplexed signals densely.

That is to say, there is a variety of modulation schemes and bit rates of signals per wavelength in optical wavelength multiplexing transmission systems in recent years; accordingly, flexible wavelength arrangement is required in order to wavelength-multiplex and accommodate optical signals efficiently. The prior art includes a technique of measuring a width of a gap between channels and, based on the measurement results, determining a wavelength control amount of a transmission wavelength transmitted from a transmitter in an opposite transponder (Patent Literature 1), a technique of monitoring whether a wavelength interval is a predetermined interval, and whether each optical signal has a predetermined wavelength (Patent Literature 2), and a technique of changing a transmission rate when it is detected for an adjacent wavelength interval to become less than a threshold (Patent Literature 3).

CITATION LIST

Patent Literature

[PTL 1] Japanese Unexamined Patent Application Publication No. 2016-010040

[PTL 2] Japanese Unexamined Patent Application Publication No. 2001-066219

[PTL 3] Japanese Unexamined Patent Application Publication No. H11-027238

SUMMARY OF INVENTION

Technical Problem

However, in the optical wavelength multiplexing transmission, a required wavelength band of an optical signal and a required wavelength interval between adjacent optical signals differ according to a type of an optical signal, characteristics of an optical fiber as a transmission line, a transmission distance, and the like; consequently, it is required to optimize them with respect to each system in order to perform denser transmission.

As described above, in the related optical wavelength multiplexing transmission systems, optical signals are arranged on a grid with a wavelength interval that is determined regardless of the optical signal band (FIG. 6). However, the line demand on optical fiber communications has been increasing significantly in recent years, and the method, of multiplexing optical signals densely by increasing frequency utilization efficiency using multilevel modulation technologies, wavelength multiplexing technologies, spectrum control technologies, and the like, is being studied. In order to wavelength-multiplex optical signals efficiently, it is necessary to set properly a required band of each optical signal and a wavelength interval between adjacent optical signals. In order to evaluate these factors quantitatively, it is necessary to actually assess influence of these factors on the optical signal in the transmission line with the same parameters. However, it is almost impossible to prepare a simulated transmission line equivalent to an actual transmission line because the design of the optical fiber transmission line multifariously differs from project to project. This makes it necessary to take a method of connecting a transponder to an actual optical fiber transmission line in a field trial and measuring optical transmission characteristics. However, there has been the problem that it is required to prepare dedicated equipment in order to carry out a field trial, which takes an immense amount of time and huge cost.

Solution to Problem

The present invention provides a test controller, an optical wavelength multiplexing transmission apparatus, a test control circuit and method, and a program recording medium that solve the above-mentioned problems.

The present invention is found in a test controller including a wavelength tunable filter controller configured to control a center wavelength and a wavelength band of an optical signal that a wavelength tunable filter transmits; and a test transponder controller configured to control a wavelength band of a test optical signal generated by a test transponder and a wavelength interval between the test optical signal and the optical signal that the wavelength tunable filter transmits.

The present invention is found in a test controller including a wavelength tunable filter controller configured to control a center wavelength and a wavelength band of an optical signal that a wavelength tunable filter transmits; and a test transponder controller configured to control a center wavelength and a wavelength band of a test optical signal received by a test transponder.

The present invention is found in an optical wavelength multiplexing transmission apparatus including a wavelength tunable filter configured to receive input of an optical signal from an additional transponder and transmit an optical signal having a controlled center wavelength and a controlled wavelength band; a test transponder configured to generate a test optical signal having a controlled wavelength band and a controlled wavelength interval with the optical signal to be transmitted; an optical coupler configured to combine optical signals from a wavelength multiplexer configured to wavelength-multiplex optical signals received from transponders, the wavelength tunable filter, and the test transponder, and outputting combined optical signal to a transmission line; and a test controller configured to control a center wavelength and a wavelength band of an optical signal that the wavelength tunable filter transmits, a wavelength band of a test optical signal generated by the test transponder, and a wavelength interval with the optical signal to be transmitted.

The present invention is found in an optical wavelength multiplexing transmission apparatus including an optical branching section configured to distribute optical signals received from a transmission line to a wavelength demultiplexer configured to output wavelength-demultiplexed optical signal to a transponder, a wavelength tunable filter, and a test transponder; the wavelength tunable filter configured to receive input of the distributed optical signal and transmit an optical signal having a controlled center wavelength and a controlled wavelength band; the test transponder configured to receive input of the distributed optical signal and receive a test optical signal having a controlled center wavelength and a controlled wavelength band; and a test controller configured to control a center wavelength and a wavelength band of an optical signal that the wavelength tunable filter transmits, and controlling a center wavelength and a wavelength band of a test optical signal received by the test transponder.

The present invention is found in a test control circuit including a wavelength tunable filter controller configured to control a center wavelength and a wavelength band of an optical signal that a wavelength tunable filter transmits; and a test transponder controller configured to control a wavelength band of a test optical signal generated by a test transponder and a wavelength interval between the test optical signal and the optical signal that the wavelength tunable filter transmits.

The present invention is found in a test control method including a step for controlling a center wavelength and a wavelength band of an optical signal that a wavelength tunable filter transmits; and a step for controlling a wavelength band of a test optical signal generated by a test transponder and a wavelength interval between the test optical signal and the optical signal that the wavelength tunable filter transmits.

The present invention is found in a program storage medium storing a program for making a computer of a test controller function as a wavelength tunable filter controller configured to control a center wavelength and a wavelength band of an optical signal that a wavelength tunable filter transmits; and a test transponder controller configured to control a wavelength band of a test optical signal generated by a test transponder and a wavelength interval between the test optical signal and the optical signal that the wavelength tunable filter transmits.

Advantageous Effects of Invention

The feature of the present invention is to include a test control circuit in an operating optical wavelength multiplexing transmission system, and make it possible to evaluate optimum values of a required wavelength band of an optical signal to be added and a required wavelength interval between the optical signal to be added and an adjacent optical signal, before applying these values to operation. The present invention makes it possible to measure easily a required band of a signal to be added and a required wavelength interval between the signal to be added and an adjacent optical signal by including a test control circuit in an optical wavelength multiplexing transmission apparatus.

EXAMPLE EMBODIMENT

Figure 1:
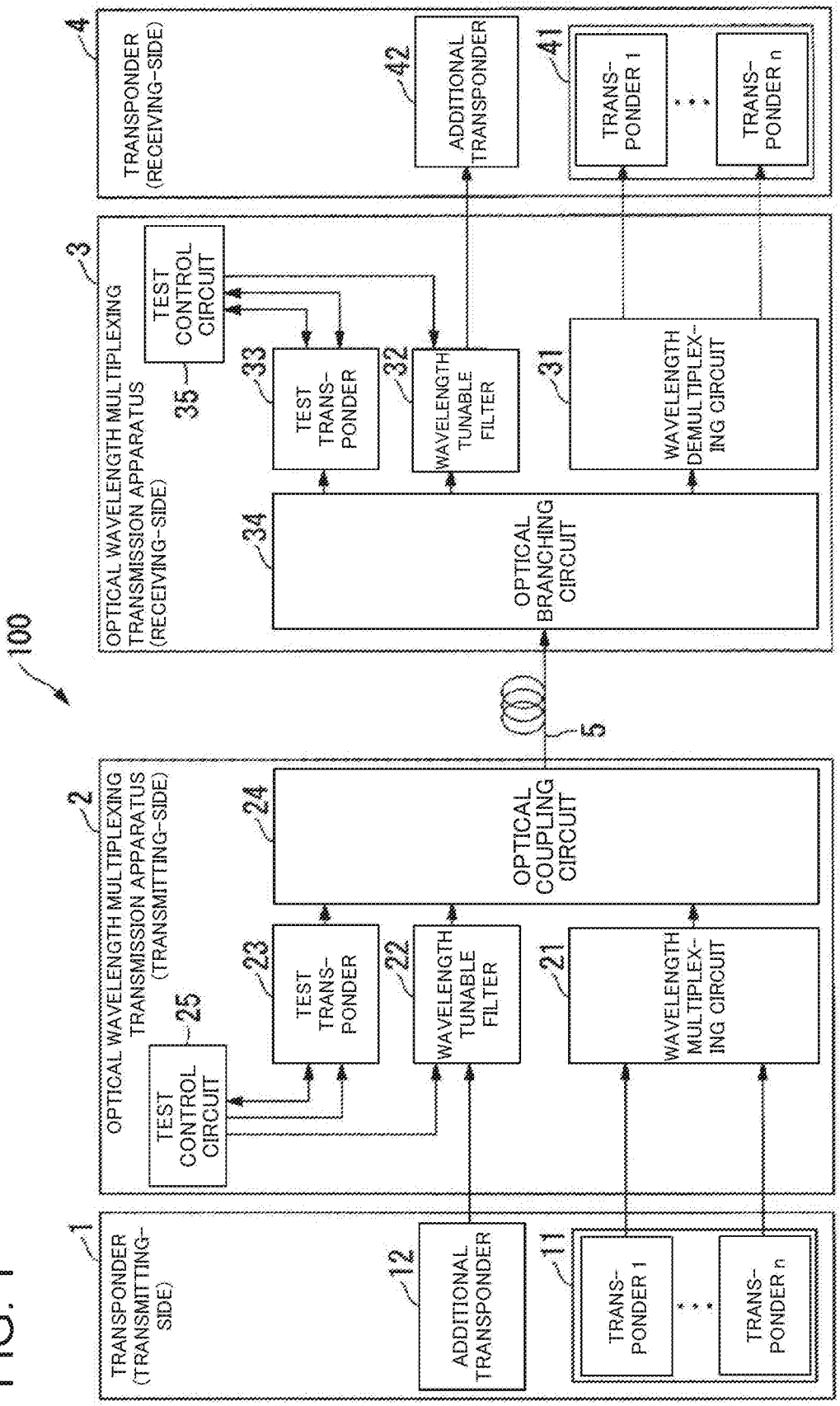
FIG. 1 is a diagram illustrating a configuration of an optical wavelength multiplexing transmission system 100 according to the present invention.

With reference to FIGS. 1 to 5, the configurations of the examples of the present invention will be sequentially described. First, FIG. 1 illustrates the configuration of optical wavelength multiplexing transmission system 100. In this configuration, a transponder 1 and an optical wavelength multiplexing transmission apparatus 2 are located on the transmitting-side, and an optical wavelength multiplexing transmission apparatus 3 and a transponder 4 are located on the receiving-side. The transmitting-side optical wavelength multiplexing transmission apparatus 2 and the receiving-side optical wavelength multiplexing transmission apparatus 3 are connected through an optical fiber transmission line 5.

The transmitting-side transponder 1 includes an existing transponder 11 that is being used for operation and an additional transponder 12, and outputs optical signals to the transmitting-side optical wavelength multiplexing transmission apparatus 2. The existing transponder 11 includes a plurality of transponders. The term "existing transponder 11" is used collectively as the plurality of transponders. The additional transponder 12 is a transponder to be newly added that is to be used and connected to wavelength multiplexing circuit 21 to which the existing transponder 11 is connected.

Corresponding to that, the receiving-side transponder 4 includes an existing transponder 41 that is being used for operation and an additional transponder 42, and receives optical signals that are output from the receiving-side optical wavelength multiplexing transmission apparatus 3. The existing transponder 41 includes a plurality of transponders. The term "existing transponder 41" is used collectively as the plurality of transponders. The additional transponder 42 is a transponder to be newly added that is to be used and connected to wavelength demultiplexing circuit 31 to which the existing transponder 41 is connected.

The receiving-side transponder 4 has the function of monitoring the quality of optical signals that the existing transponder 41 and the additional transponder 42 receive, and can read the information monitored by a monitor (not shown) placed outside the receiving-side transponder 4. A monitor (not shown) is also placed outside the transmitting-side transponder 1. The transmitting-side and receiving-side monitors are connected through a communication line, and can obtain monitored information mutually. For example, an operator of the transmitting-side transponder 1 can obtain the information monitored by the receiving-side transponder 4.

Next, with reference to FIG. 2, the configuration of the transmitting-side optical wavelength multiplexing transmission apparatus 2 will be described. The transmitting-side optical wavelength multiplexing transmission apparatus 2 includes a wavelength multiplexing circuit 21 that receives input of optical signals from each existing transponder 11 and wavelength-multiplexes the optical signals; a wavelength tunable filter 22 that receives input of optical signals from the additional transponder 12, with its transmission wavelength band varying in accordance with the control by a test control circuit 25; a test transponder 23 that generates test optical signals in accordance with the control by the test control circuit 25; an optical coupling circuit 24 that combines wavelength-independently an existing optical wavelength multiplexed signal output from the wavelength multiplexing circuit 21, an optical signal transmitted from the additional transponder 12 through the wavelength tunable filter 22, and a test optical signal output from the test transponder 23; and a test control circuit 25 that controls the wavelength tunable filter 22 and the test transponder 23. The test control circuit 25 controls the center wavelength and wavelength band (bandwidth) of the optical signal that the wavelength tunable filter 22 transmits, the wavelength band (bandwidth) of the test optical signal generated by the test transponder 23, and a wavelength interval between adjacent optical signals. The adjacent optical signal is an optical signal that the wavelength tunable filter 22 transmits.

The test control circuit 25 in the transmitting-side optical wavelength multiplexing transmission apparatus 2 and the test control circuit 35 in the receiving-side optical wavelength multiplexing transmission apparatus 3 can communicate with each other through a digital communication channel of the test transponders 23, 33, and exchange information such as wavelength setting between opposing circuits. In an example embodiment, from the test control circuit 25 to the test control circuit 35, the information is transmitted on the center wavelength and wavelength band of the optical signal that the wavelength tunable filter 22 transmits, the wavelength band of test optical signal generated by the test transponder 23, and the wavelength interval between the test optical signal and the optical signal that the wavelength tunable filter 22 transmits. In another example embodiment, the transmission of the information is performed every time the setting is changed.

Figure 3:
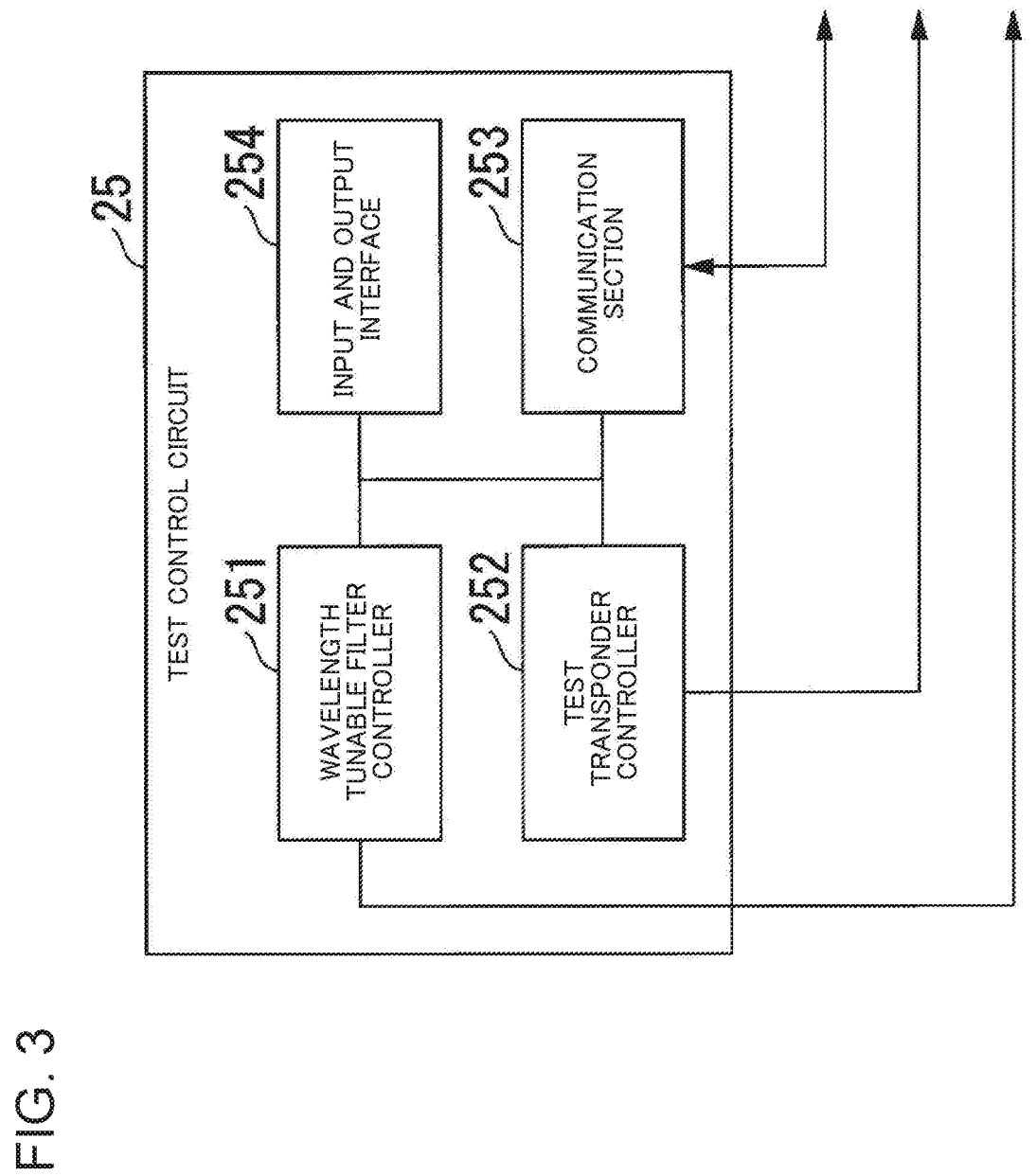
FIG. 3 is a diagram illustrating a configuration of a test control circuit 25 included in the transmitting-side optical wavelength multiplexing transmission apparatus 2 according to the present invention.

FIG. 3 illustrates the configuration of the test control circuit 25 included in the transmitting-side optical wavelength multiplexing transmission apparatus 2. Input and output interface 254 is an interface for an operator to connect an external device and is used in order that the operator can control each section through the external device. The operator instructs wavelength tunable filter controller 251, through the external device, on the center wavelength and the wavelength band that the wavelength tunable filter 22 transmits, and instructs the test transponder controller 252 on the wavelength band of the test optical signal generated by the test transponder 23 and the wavelength interval between the test optical signal and the optical signal that the wavelength tunable filter 22 transmits. The wavelength tunable filter controller 251 sets, in accordance with the above-described instructions, the center wavelength and the wavelength band that the wavelength tunable filter 22 transmits. The test transponder controller 252 sets, in accordance with the above-described instructions, the wavelength band of the test optical signal generated by the test transponder 23 and the wavelength interval between the test optical signal and the optical signal that the wavelength tunable filter 22 transmits. Communication section 253 communicates with communication section 353 of the test control circuit 35 in the receiving-side optical wavelength multiplexing transmission apparatus 3 over the digital communication channel between the test transponders 23, 33, and exchanges the information. The function of the test control circuit 25 may be implemented using a computer and a program.

Figure 4:
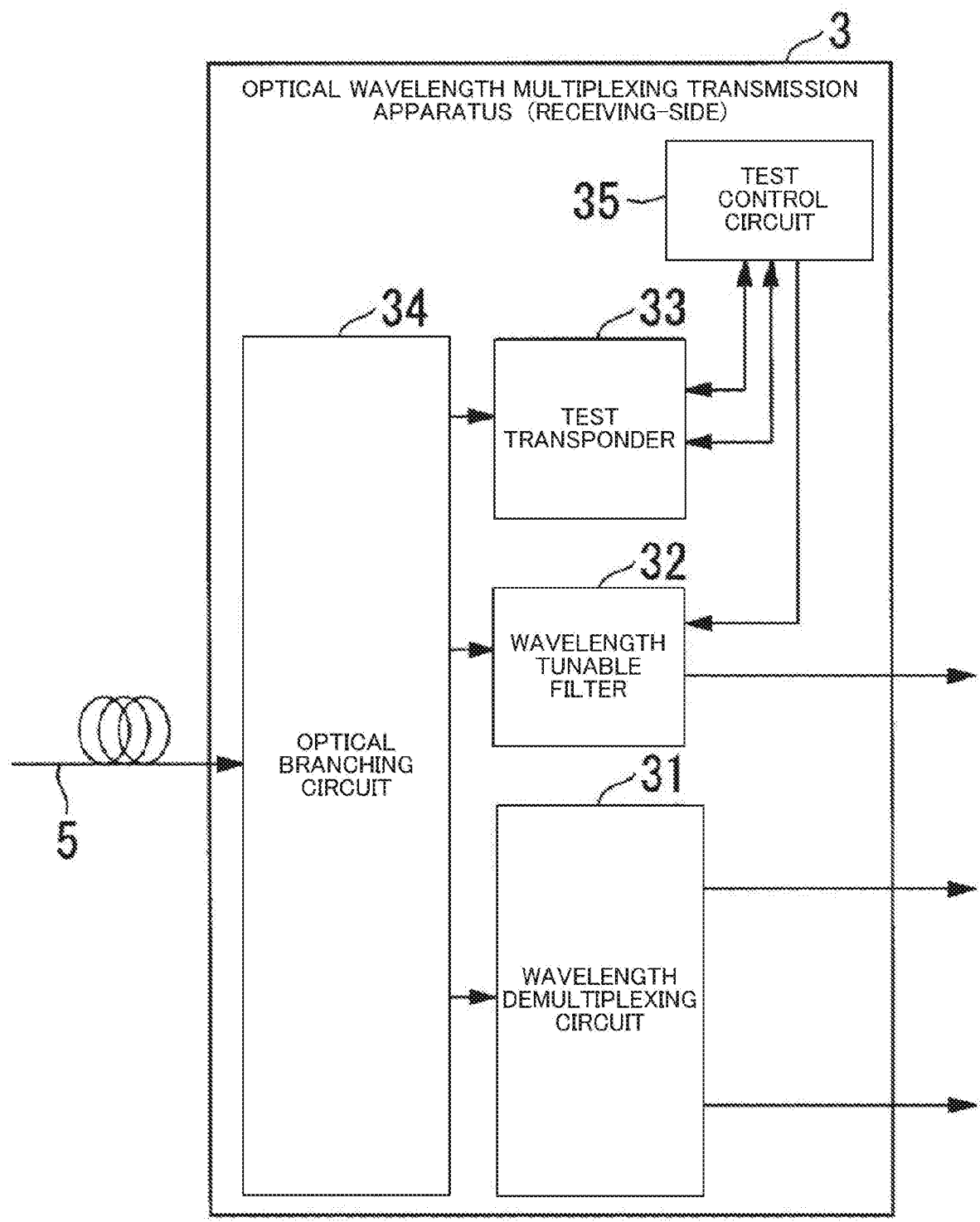
FIG. 4 is a diagram illustrating a configuration of a receiving-side optical wavelength multiplexing transmission apparatus 3 according to the present invention.

Next, the configuration of the receiving-side optical wavelength multiplexing transmission apparatus 3 will be described with reference to FIG. 4. The optical wavelength multiplexing transmission apparatus 3 includes an optical branching circuit 34 that wavelength-independently distributes the optical wavelength-multiplexed signals received from the optical fiber transmission line 5; a wavelength demultiplexing circuit 31 that wavelength-demultiplexes the optical wavelength multiplexed signals output from the optical branching circuit 34 and outputs the optical signal to each existing transponder 41; a wavelength tunable filter 32 that transmits an optical signal through an arbitrary band from among the optical wavelength-multiplexed signals output from the optical branching circuit 34 in accordance with the control by the test control circuit 35 and outputs the optical signal to the additional transponder 42; a test transponder 33 that receives a test optical signal out of the optical wavelength-multiplexed signals output from the optical branching circuit 34 in accordance with the control by the test control circuit 35; and the test control circuit 35 that controls the wavelength tunable filter 32 and the test transponder 33. In an example embodiment, the test control circuit 35 receives, from the transmitting-side test control circuit 25, the information on the center wavelength and the wavelength band of optical signals that the wavelength tunable filter 22 transmits, the wavelength band of the test optical signal generated by the test transponder 23, and the wavelength interval between the test optical signal and the optical signal that the wavelength tunable filter 22 transmits. In an example embodiment, the reception of the information is performed every time the setting is changed on the transmitting-side. The test control circuit 35 sets, in accordance with the received information, the center wavelength and the wavelength band that the wavelength tunable filter 32 transmits, and the center wavelength and the wavelength band of the test optical signal that the test transponder 33 receives (calculated from the received information). The test control circuit 35 can cause the test transponder 33 to monitor the quality of the test optical signal and obtain the monitored information; however, there is no need to monitor the quality of the test optical signal when assessing influence of the test optical signal on the optical signal from the additional transponder 12.

Figure 5:
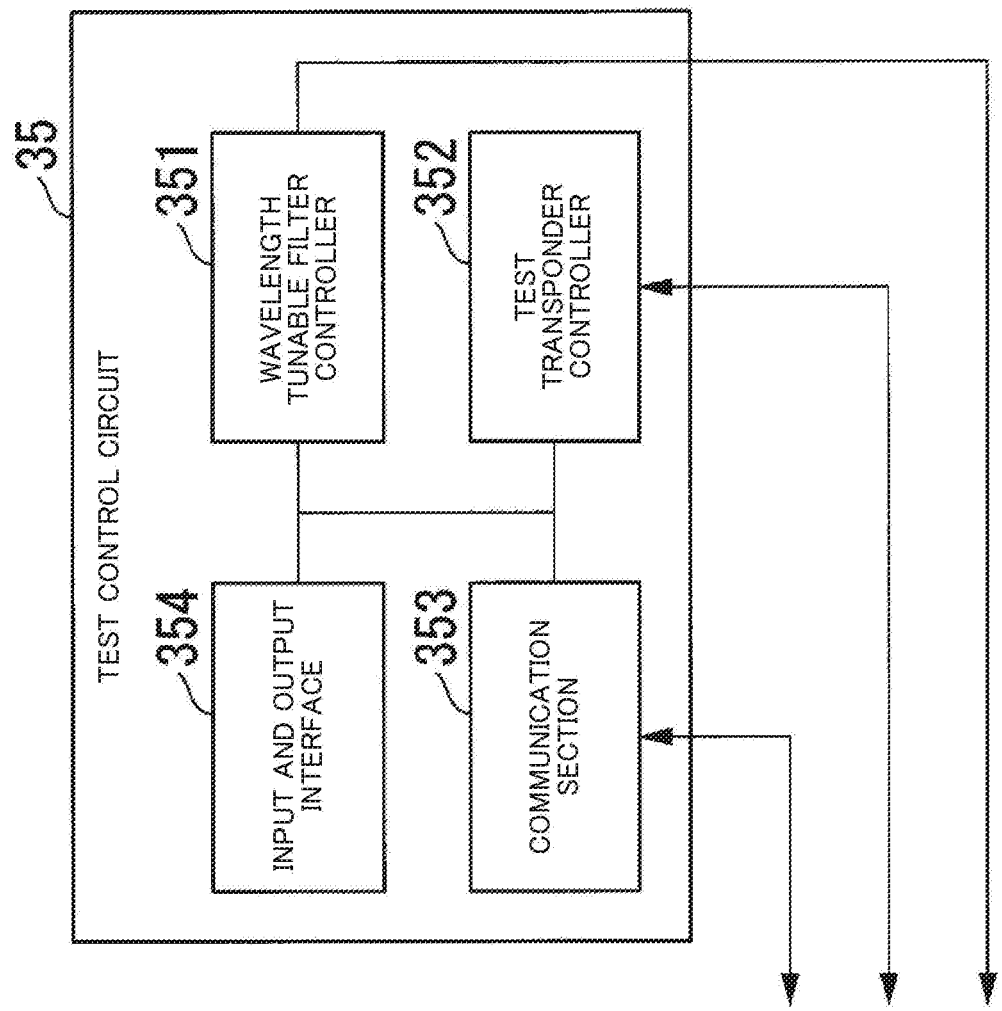
FIG. 5 is a diagram illustrating a configuration of a test control circuit 35 included in the receiving-side optical wavelength multiplexing transmission apparatus 3 according to the present invention.

FIG. 5 illustrates the configuration of the test control circuit 35 included in the receiving-side optical wavelength multiplexing transmission apparatus 3. The wavelength tunable filter controller 351 sets the center wavelength and the wavelength band that the wavelength tunable filter 32 transmits, in accordance with the information received from the above-described transmitting-side test control circuit 25. The test transponder controller 352 sets the center wavelength and wavelength band of the test optical signal that the test transponder 33 receives, in accordance with the information received from the above-described transmitting-side test control circuit 25. Further, the test transponder controller 352 can also cause the test transponder 33 to monitor the quality of the received test optical signal and obtain the monitored information. The communication section 353 communicates with the communication section 253 of the test control circuit 25 in the transmitting-side optical wavelength multiplexing transmission apparatus 2 over the digital communication channel between the test transponders 23, 33, and exchanges the information. The input and output interface 354 is an interface for an operator to connect an external device and is used in order that the operator can control each section through the external device. The function of the test control circuit 35 may be implemented using a computer and a program.

Figure 2:
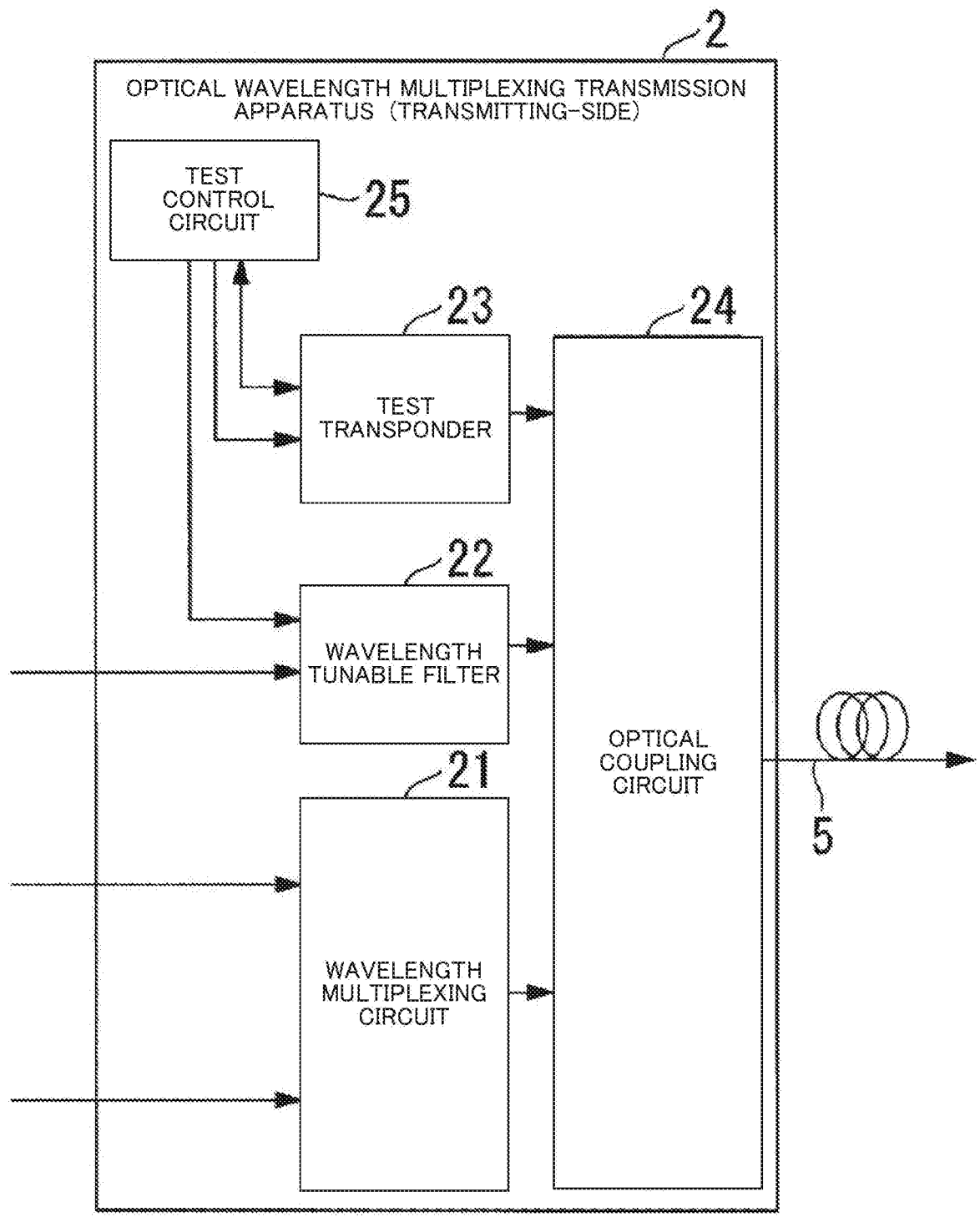
FIG. 2 is a diagram illustrating a configuration of a transmitting-side optical wavelength multiplexing transmission apparatus 2 according to the present invention.

The transmitting-side optical wavelength multiplexing transmission apparatus 2 according to the present invention may be constructed as a device including the components illustrated in FIG. 2. Alternatively, as an example, if an existing device includes the wavelength multiplexing circuit 21 and the optical coupling circuit 24 with expansion ports, the transmitting-side optical wavelength multiplexing transmission apparatus 2 may be constructed by connecting the wavelength tunable filter 22 and the test transponder 23 to the expansion ports, and further connecting the test control circuit 25 to the wavelength tunable filter 22 and the test transponder 23. The same goes for the receiving-side optical wavelength multiplexing transmission apparatus 3.

With reference to FIG. 1 again, the operation of the optical wavelength multiplexing transmission system 100 to evaluate the wavelength band and the wavelength interval when adding the additional transponders 12, 42 to the existing transponders 11, 41 will be described. The additional transponders 12, 42 are connected to the wavelength tunable filters 22, 32 whose wavelength bands can be changed arbitrarily, and the influence of the optical signal on the transmission band is evaluated.

The wavelength bands of the test transponders 23, 33 are arbitrarily set, and the wavelength interval between those and the wavelength bands of the additional transponders 12, 42 are changed to evaluate the influence of mutual interference.

The optical signal output of the additional transponder 12 is connected to the wavelength tunable filter 22. The wavelength tunable filter 22 is a band pass filter with a variable transmission band, and its center wavelength is set at a test wavelength instead of the wavelength used in the actual operation. The filter band can be set to an arbitrary band by control of the test control circuit 25.

The test transponder 23 is a transponder for measuring the influence of the line quality due to the mutual interference with the additional transponder 12, and an arbitrary wavelength is set in the test transponder 23 by a control signal from the test control circuit 25. The optical signals output from the wavelength tunable filter 22 and the test transponder 23 are combined, in the optical coupling circuit 24, together with the existing optical wavelength multiplexed signals from the wavelength multiplexing circuit 21, and the combined signals are output to the optical fiber transmission line 5.

In the receiving-side optical wavelength multiplexing transmission apparatus 3, the optical wavelength multiplexed signals received from the optical fiber transmission line 5 are triply branched in the optical branching circuit 34 and output to the wavelength demultiplexing circuit 31, the wavelength tunable filter 32, and the test transponder 33. The wavelength demultiplexing circuit 31 demultiplexes the received existing optical wavelength multiplexed signals with respect to each wavelength and outputs the demultiplexed signal to each existing transponder 41. The wavelength tunable filter 32 is a band pass filter with a variable transmission band as with the wavelength tunable filter 22 of the transmitting-side optical wavelength multiplexing transmission apparatus 2, and its center wavelength is set at a test wavelength. The transmission band of the wavelength tunable filter 32 can be arbitrarily set by control of the test control circuit 35. The optical signal that the wavelength tunable filter 32 has transmitted with an arbitrary band is received by the additional transponder 42. The additional transponder 42 monitors the line quality (error rate) of the received optical signal and detects the signal degradation. The test transponder 33 receives the optical signal transmitted by the transmitting-side test transponder 23. The test transponder 33 can also monitor the line quality (error rate) of the received optical signal and detect the signal degradation. The optical transmit-receive wavelengths of the test transponders 23 and 33 can be arbitrarily set through the test control circuits 25 and 35. The test control circuits 25 and 35 can communicate with each other through the digital communication channel between the test transponders 23 and 33, and can share information such as the wavelength bands of the wavelength tunable filters 22, 32, the set wavelengths of the test transponders 23, 33, and measured line quality.

Next, the operation of the additional transponders 12, 42 will be described. The optical signal output from the additional transponder 12 passes through the wavelength tunable filters 22, 32 and is received by the additional transponder 42. The bands of the wavelength tunable filters 22, 32 can be changed by control of the test control circuits 25, 35, and the error rate of the optical signal is measured by the additional transponder 42 using the bands of the wavelength tunable filters 22, 32 as a parameter. The error rate is constant when the bands of the wavelength tunable filters 22, 32 are wider than the band of the optical signal, and the error rate increases when the bands of the wavelength tunable filters 22, 32 are narrower than the band of the optical signal. This makes it possible to obtain the required band of the optical signal of the additional transponder 12.

Next, the wavelength bands of the optical signals of the test transponders 23, 33 are set so as to be adjacent to the optical signal of the additional transponder 12, and the error rate of the optical signal of the additional transponder 42 is measured. The error rate is measured using the wavelength interval between the optical signals of the test transponders 23, 33 and those of the additional transponders 12, 42 as a parameter, which makes it possible to measure the influence on mutual line quality. The mutual effect is small with wider wavelength interval, and the error rate does not increase; however, the error rate increases when the wavelength interval narrows into the occurrence of the mutual interference. This makes it possible to measure the wavelength interval that should be maintained between adjacent optical signals.

The above will be described again along with the evaluation procedure in expanding a transponder. In the present invention, in expanding the line of the optical wavelength multiplexing transmission system 100 (optical signal expansion by adding a transponder), the bandwidth of the additional transponder and a span of influence of mutual interference between adjacent optical signals are measured using a test wavelength band, and the center wavelength of the additional transponder is set at a wavelength with no influence on the optical signal in operation, using the obtained information.

Figure 6:
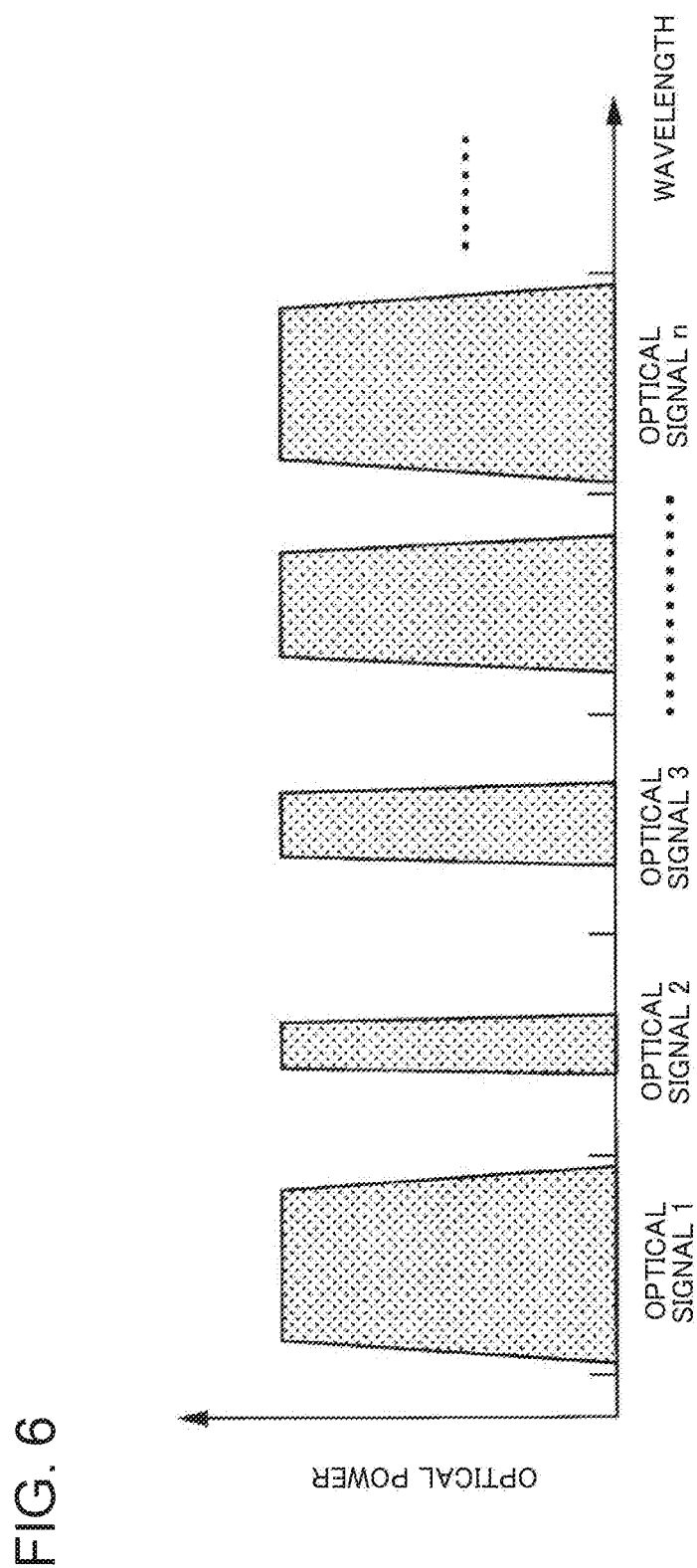
FIG. 6 is a diagram illustrating an arrangement example of related optical signals.
Figure 7:
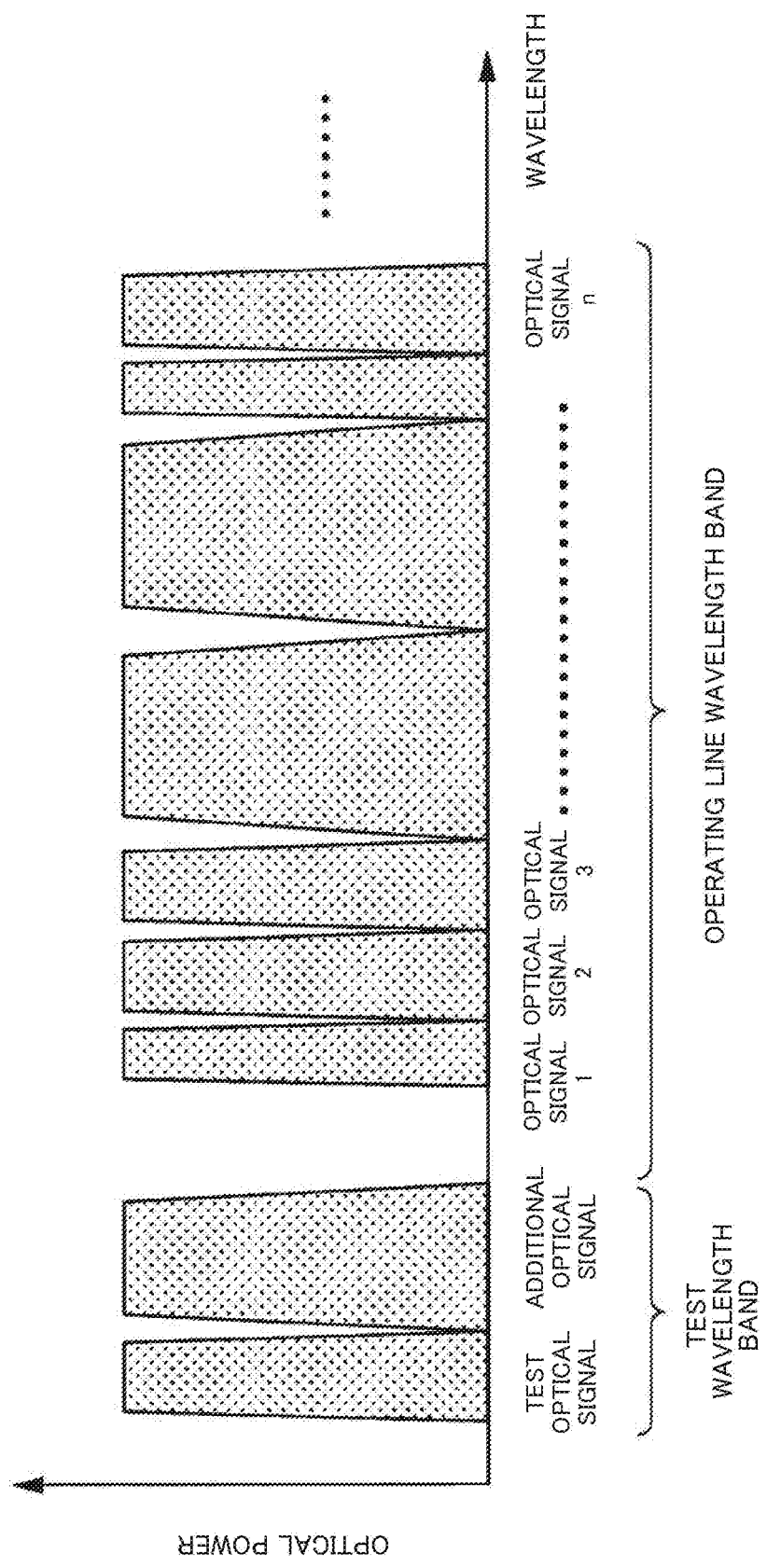
FIG. 7 is a diagram illustrating an arrangement example of optical signals according to the present invention.

When the wavelength interval is fixed as illustrated in FIG. 6, the occupied bands of optical signal 1 to optical signal n differ; however, the interval between the center wavelengths is the same; accordingly, there are many gaps, and the frequency utilization efficiency is low. In contrast, as illustrated in FIG. 7, when the interval between the center wavelengths is not fixed (flexible), the optical signals are arranged closing up the wavelength intervals depending on the occupied bands of optical signal 1 to optical signal n; consequently, the frequency utilization efficiency is high. When the interval between the center wavelengths is fixed as illustrated in FIG. 6, it is only necessary to simply set a wavelength in an arbitrary empty channel in expanding the line (optical signal expansion). However, when the interval between the center wavelengths is not fixed (flexible) as illustrated in FIG. 7, in expanding the line (optical signal expansion), it is necessary to set the wavelength after understanding the band that a transponder to be added requires and the span of mutual interference with adjacent optical signals. The band required by a transponder to be added differs according to the transmission speed in operation and modulation scheme in operation.

As an example, transponders are added by the following procedure:
(i) First, the required bands of the additional transponders 12, 42 are obtained.
a. The optical output wavelengths of the additional transponders 12, 42 are set in "a test wavelength band".
b. The additional transponders 12, 42 are respectively connected to the wavelength tunable filters 22, 32; then, with operating states in the same transmission speed and modulation scheme as those in operation, referring to the line quality monitored by the additional transponder 42, increasing and decreasing the bandwidth that the wavelength tunable filters 22, 32 transmit; in this way, the wavelength bandwidth is measured with which the additional transponders 12, 42 can transmit and receive optical signals maintaining a constant error rate.

As an example embodiment, an operator sends, to the wavelength tunable filter controller 251 through the input and output interface 254 of the test control circuit 25, an instruction to set the center wavelength and the wavelength band of optical signals that the wavelength tunable filter 22 transmits; and then the operator sends an instruction to decrease the wavelength band and obtains the information on the error rate obtained by the receiving-side additional transponder 42 through the monitors (not shown) placed outside the above-mentioned receiving-side and transmitting-side transponders 4, 1. If the error rate does not increase, the operator sends an instruction to decrease the wavelength band through the input and output interface 254, and if the error rate increases, the operator sends an instruction to increase the bandwidth through the input and output interface 254. By repeating the above procedure, the wavelength bandwidth is measured with which the additional transponders 12, 42 can transmit and receive optical signals maintaining a constant error rate.

(ii) Next, the wavelength interval is obtained that should be maintained between the optical signal of the additional transponders 12, 42 and an adjacent optical signal.

c. By making the test transponders 23, 33 operate varying the center wavelength around the wavelength bandwidth of the optical output of the additional transponders 12, 42 measured in the above (i), that is, by setting the center wavelength close to near or away from the optical output wavelength of the additional transponders 12, 42, the wavelength interval with less influence of line quality deterioration due to the mutual interference is obtained.

As an example embodiment, an operator sends, to the test transponder controller 252 through the input and output interface 254 of the test control circuit 25, an instruction to set a wavelength interval between the wavelength band of test optical signal (the wavelength band measured in (i)) and the wavelength band that the wavelength tunable filter 22 transmits;

and then the operator sends an instruction to decrease the wavelength interval and obtains the information on the error rate obtained by the receiving-side additional transponder 42 through the monitors (not shown) placed outside the above-mentioned receiving-side and transmitting-side transponders 4, 1. If the error rate does not increase, the operator sends an instruction to decrease the wavelength interval through the input and output interface 254, and if the error rate increases, the operator sends an instruction to increase the wavelength interval through the input and output interface 254. By repeating the above procedure, the wavelength interval is measured with which the additional transponders 12, 42 can transmit and receive optical signals maintaining a constant error rate.

(iii) Based on the test evaluation results in (i) and (ii), the center wavelength band of the optical outputs of the additional transponders 12, 42 is set. In other words, it is possible to add an optical signal at a wavelength position with no influence on the line in operation, using the evaluation results obtained by being tested in a transmission line in operation.

(iv) The additional transponder 12 is connected to the wavelength multiplexing circuit 21, and the additional transponder 42 is connected to the wavelength demultiplexing circuit 31; and then the operation is started.

Even when the test wavelength is changed to the actual operating wavelength, the bandwidth of the additional transponder and the interval with an adjacent optical signal are not much affected. Although the communication quality S/N (signal/noise) is changed by the wavelength change, such a change can be recognized in advance and can be corrected. As described above, in the test evaluation of the additional transponder, the parameters can be measured synchronizing the opposing additional transponders 12, 42 with each other.

Figure 8:
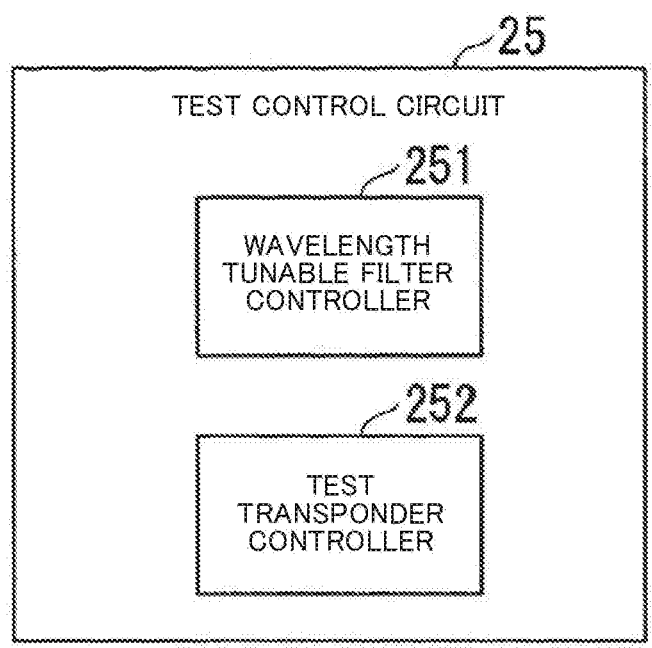
FIG. 8 is a diagram illustrating a minimum configuration of a test control circuit 25 according to the present invention.

FIG. 8 is a diagram illustrating the minimum configuration of the test control circuit 25 according to the present invention. As illustrated in FIG. 8, the test control circuit 25 includes at least the wavelength tunable filter controller 251 and the test transponder controller 252.

The whole or part of the example embodiments disclosed above can be described as, but not limited to, the following supplementary notes.

Supplementary Note 1

A test controller, comprising:
a wavelength tunable filter controller configured to control a center wavelength and a wavelength band of an optical signal that a wavelength tunable filter transmits; and
a test transponder controller configured to control a wavelength band of a test optical signal generated by a test transponder and a wavelength interval between the test optical signal and the optical signal that the wavelength tunable filter transmits.

Supplementary Note 2

The test controller according to Supplementary Note 1, wherein the test controller transmits, to a receiving-side test controller, information on a center wavelength and a wavelength band of an optical signal that the wavelength tunable filter transmits, a wavelength band of a test optical signal generated by the test transponder, and a wavelength interval with the optical signal to be transmitted.

Supplementary Note 3

A test controller, comprising:
a wavelength tunable filter controller configured to control a center wavelength and a wavelength band of an optical signal that a wavelength tunable filter transmits; and
a test transponder controller configured to control a center wavelength and a wavelength band of a test optical signal received by a test transponder.

Supplementary Note 4

The test controller according to Supplementary Note 3, wherein
the test controller receives, from a transmitting-side test controller, information, set on a transmitting-side, on a center wavelength and a wavelength band of an optical signal that a transmitting-side wavelength tunable filter transmits, a wavelength band of a test optical signal generated by a transmitting-side test transponder, and a wavelength interval with the optical signal to be transmitted.

Supplementary Note 5

The test controller according to Supplementary Note 4, wherein,
the test controller controls, according to the received information, a center wavelength and a wavelength band of an optical signal that the wavelength tunable filter transmits, and a center wavelength and a wavelength band of a test optical signal received by the test transponder.

Supplementary Note 6

An optical wavelength multiplexing transmission apparatus, comprising:
a wavelength tunable filter configured to receive input of an optical signal from an additional transponder and transmit an optical signal having a controlled center wavelength and a controlled wavelength band;
a test transponder configured to generate a test optical signal having a controlled wavelength band and a controlled wavelength interval with the optical signal to be transmitted;
an optical coupler configured to combine optical signals from a wavelength multiplexer configured to wavelength-multiplex optical signals received from transponders, the wavelength tunable filter, and the test transponder, and outputting combined optical signal to a transmission line; and
a test controller configured to control a center wavelength and a wavelength band of an optical signal that the wavelength tunable filter transmits, a wavelength band of a test optical signal generated by the test transponder, and a wavelength interval with the optical signal to be transmitted.

Supplementary Note 7

An optical wavelength multiplexing transmission apparatus, comprising:
an optical branching section configured to distribute optical signals received from a transmission line to a wavelength demultiplexer configured to output wavelength-demultiplexed optical signal to a transponder, a wavelength tunable filter, and a test transponder;
the wavelength tunable filter configured to receive input of the distributed optical signal and transmit an optical signal having a controlled center wavelength and a controlled wavelength band;
the test transponder configured to receive input of the distributed optical signal and receive a test optical signal having a controlled center wavelength and a controlled wavelength band; and
a test controller configured to control a center wavelength and a wavelength band of an optical signal that the wavelength tunable filter transmits, and controlling a center wavelength and a wavelength band of a test optical signal received by the test transponder.

Supplementary Note 8

A test control circuit, comprising:
a wavelength tunable filter controller configured to control a center wavelength and a wavelength band of an optical signal that a wavelength tunable filter transmits; and
a test transponder controller configured to control a wavelength band of a test optical signal generated by a test transponder and a wavelength interval between the test optical signal and the optical signal that the wavelength tunable filter transmits.

Supplementary Note 9

A test control circuit, comprising:
a wavelength tunable filter controller configured to control a center wavelength and a wavelength band of an optical signal that a wavelength tunable filter transmits; and
a test transponder controller configured to control a center wavelength and a wavelength band of a test optical signal received by a test transponder.

Supplementary Note 10

A test control method, comprising:
a step for controlling a center wavelength and a wavelength band of an optical signal that a wavelength tunable filter transmits; and
a step for controlling a wavelength band of a test optical signal generated by a test transponder and a wavelength interval between the test optical signal and the optical signal that the wavelength tunable filter transmits.

Supplementary Note 11

A test control method, comprising:
a step for controlling a center wavelength and a wavelength band of an optical signal that a wavelength tunable filter transmits; and a step for controlling a center wavelength and a wavelength band of a test optical signal received by a test transponder.

Supplementary Note 12

A program storage medium storing a program for making a computer of a test controller function as a wavelength tunable filter controller configured to control a center wavelength and a wavelength band of an optical signal that a wavelength tunable filter transmits; and a test transponder controller configured to control a wavelength band of a test optical signal generated by a test transponder and a wavelength interval between the test optical signal and the optical signal that the wavelength tunable filter transmits.

Supplementary Note 13

A program storage medium storing a program for making a computer of a test controller function as a wavelength tunable filter controller configured to control a center wavelength and a wavelength band of an optical signal that a wavelength tunable filter transmits; and a test transponder controller configured to control a center wavelength and a wavelength band of a test optical signal received by a test transponder.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-069165, filed on Mar. 30, 2017, the disclosure of which is incorporated herein in its entirety by reference.

INDUSTRIAL APPLICABILITY

The present invention can be applied to an optical wavelength multiplexing transmission system using optical fibers.

REFERENCE SIGNS LIST

1 Transponder (transmitting-side)
2 Optical wavelength multiplexing transmission apparatus (transmitting-side)
3 Optical wavelength multiplexing transmission apparatus (receiving-side)
4 Transponder (receiving-side)
5 Optical fiber transmission line
11, 41 Existing transponder
12, 42 Additional transponder
21 Wavelength multiplexing circuit
22, 32 Wavelength tunable filter
23, 33 Test transponder
24 Optical coupling circuit
25, 35 Test control circuit
31 Wavelength demultiplexing circuit
34 Optical branching circuit
100 Optical wavelength multiplexing transmission system
251, 351 Wavelength tunable filter controller
252, 352 Test transponder controller
253, 353 Communication section
254, 354 Input and output interface

What is claimed is:

1. A test controller, comprising:
a wavelength tunable filter controller configured to control a center wavelength and a wavelength band of an optical signal that a wavelength tunable filter transmits; and
a test transponder controller configured to control a center wavelength and a wavelength band of a test optical signal received by a test transponder,
wherein the test controller receives, from a transmitting-side test controller, information, set on a transmitting-side, on a center wavelength and a wavelength band of an optical signal that a transmitting-side wavelength tunable filter transmits, a wavelength band of a test optical signal generated by a transmitting-side test transponder, and a wavelength interval with the optical signal to be transmitted, and
wherein the test controller controls, according to the received information, a center wavelength and a wavelength band of an optical signal that the wavelength tunable filter transmits, and a center wavelength and a wavelength band of a test optical signal received by the test transponder.

2. An optical wavelength multiplexing transmission system, comprising:
a first optical wavelength multiplexing transmission apparatus, and a second optical wavelength multiplexing transmission apparatus, wherein
the first optical wavelength multiplexing transmission apparatus includes
a first wavelength tunable filter configured to receive input of an optical signal from an additional transponder and transmit an optical signal having a controlled center wavelength and a controlled wavelength band;
a first test transponder configured to generate a test optical signal having a controlled wavelength band and a controlled wavelength interval with the optical signal to be transmitted;
an optical coupler configured to combine optical signals from a wavelength multiplexer configured to wavelength-multiplex optical signals received from first transponders, the first wavelength tunable filter, and the first test transponder, and output combined optical signal to a transmission line; and
a first test controller configured to control a center wavelength and a wavelength band of an optical signal that the first wavelength tunable filter transmits, a wavelength band of a test optical signal generated by the first test transponder, and a wavelength interval with the optical signal to be transmitted.

3. The optical wavelength multiplexing transmission system according to claim 2, wherein
the second optical wavelength multiplexing transmission apparatus includes
an optical branching section configured to distribute optical signals received from the transmission line to a wavelength demultiplexer configured to output wavelength-demultiplexed optical signal to a second transponder, a second wavelength tunable filter, and a second test transponder;
the second wavelength tunable filter configured to receive input of the distributed optical signal and transmit an optical signal having a controlled center wavelength and a controlled wavelength band;
the second test transponder configured to receive input of the distributed optical signal and receive a test optical signal having a controlled center wavelength and a controlled wavelength band; and a second test controller configured to control a center wavelength and a wavelength band of an optical signal that the second wavelength tunable filter transmits, and control a center wavelength and a wavelength band of a test optical signal received by the second test transponder.

4. A transmission apparatus, comprising:

a test controller comprising:

a wavelength tunable filter controller configured to control a center wavelength and a wavelength band of an optical signal that a wavelength tunable filter transmits; and a test transponder controller configured to control a wavelength band of a test optical signal generated by a test transponder and a wavelength interval between the test optical signal and the optical signal that the wavelength tunable filter transmits, wherein the optical signal is generated by an additional transponder, wherein the wavelength tunable filter is configured to receive input of an optical signal from the additional transponder and transmit the optical signal having the controlled center wavelength and the controlled wavelength band; and wherein the test transponder is configured to generate the test optical signal having the controlled wavelength band and the controlled wavelength interval with the optical signal to be transmitted.

5. A transmission apparatus, comprising:

a test controller comprising:

a wavelength tunable filter controller configured to control a center wavelength and a wavelength band of an optical signal that a wavelength tunable filter transmits; and a test transponder controller configured to control a center wavelength and a wavelength band of a test optical signal received by a test transponder, wherein the optical signal is generated by an additional transponder, wherein the wavelength tunable filter is configured to receive input of an optical signal from the additional transponder and transmit the optical signal having the controlled center wavelength and the controlled wavelength band; and wherein the test transponder is configured to receive the test optical signal having the controlled center wavelength and the controlled wavelength band.

* * * * *